(12) United States Patent
Schuster

(10) Patent No.: US 7,658,164 B2
(45) Date of Patent: Feb. 9, 2010

(54) METHOD, COMPUTER PROGRAM PRODUCT AND ARRANGEMENT FOR CONTROLLING THE MILKING BY A MILKING MACHINE

(75) Inventor: Anders Schuster, Hörby (SE)

(73) Assignee: Delaval Holding AB, Tumba (SE)

( * ) Notice: Subject to any disclaimer, the term of this patent is extended or adjusted under 35 U.S.C. 154(b) by 293 days.

(21) Appl. No.: 11/667,474

(22) PCT Filed: Dec. 13, 2005

(86) PCT No.: PCT/SE2005/001901

§ 371 (c)(1),
(2), (4) Date: May 10, 2007

(87) PCT Pub. No.: WO2006/068581

PCT Pub. Date: Jun. 29, 2006

(65) Prior Publication Data

US 2007/0283893 A1     Dec. 13, 2007

(30) Foreign Application Priority Data

Dec. 20, 2004   (SE) .................................... 0403088

(51) Int. Cl.
*A01J 3/00*     (2006.01)
(52) U.S. Cl. ................................................. 119/14.02
(58) Field of Classification Search .............. 119/14.02, 119/14.08, 14.1
See application file for complete search history.

(56) References Cited

U.S. PATENT DOCUMENTS

| 4,011,838 A | * | 3/1977 | Nordegren et al. ....... 119/14.08 |
| 4,112,758 A | * | 9/1978 | Heidecker .................... 73/218 |
| 5,054,425 A | | 10/1991 | Grimm et al. |
| 5,896,827 A | * | 4/1999 | Brown ..................... 119/14.02 |

FOREIGN PATENT DOCUMENTS

| DE | 3609275 | 9/1987 |
| DE | 19900274 | 7/2000 |
| EP | 0954962 | 11/1999 |
| WO | WO 01/19169 | 3/2001 |

OTHER PUBLICATIONS

International Search Report (PCT/ISA/210).
International Preliminary Examination Report dated Jul. 5, 2007 for corresponding International Application No. PCT/SE2005/001901.

* cited by examiner

*Primary Examiner*—Thomas Price
(74) *Attorney, Agent, or Firm*—Harness, Dickey & Pierce, P.L.C.

(57) ABSTRACT

A method for controlling the milking by a milking machine comprises the steps of: (i) controlling (47) a milking vacuum so that the milking vacuum is varied through the vacuum levels of a given range, while a milking animal is milked by the aid of the milking vacuum; (ii) monitoring (43) a milk flow from the milking animal during the variation of the vacuum levels; (iii) setting (49) the milking vacuum to the lowest vacuum level of the given range, for which the milk flow from the milking animal is at least a given fraction of the highest milk flow monitored while the milking vacuum is varied; and (iv) keeping (51) the milking vacuum at the set vacuum level during a following part of the milking of the milking animal.

18 Claims, 2 Drawing Sheets

METHOD, COMPUTER PROGRAM PRODUCT AND ARRANGEMENT FOR CONTROLLING THE MILKING BY A MILKING MACHINE

TECHNICAL FIELD OF THE INVENTION

The present invention relates generally to dairy farming and to milking of dairy animals therein. Particularly, the invention relates to a method for controlling the milking by a milking machine, to a computer program product for carrying out the method when being run on a computer, and to an arrangement for controlling and monitoring the milking at a milking station.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time, while, is naturally, ethical aspects as well as animal care are considered.

Machine milking, as known in the art, generally utilizes teat cups and vacuum sources to perform the milking function. In such systems each teat is contained within a teat cup having a teat receiving liner, inside the teat cup next to the teat. A working vacuum is applied to the interior of each teat cup liner to draw the milk from the teat, with the teat liners periodically opened and collapsed by applications of a pulsating massage vacuum between the liner and the inside of the cup. This periodic working of the teat liners results in the periodic flow of milk from each teat into a milk line, and constitutes the actual milking of the cow.

U.S. Pat. No. 4,011,838 by Nordegren et al. discloses a milking machine system including a flow rate sensing device, a timing device, and a system control means for varying the character of the working and pulsating massage vacuums during the milking process, in response to the rate of milk flow and to time. The milking machine system can be controlled in predetermined phases, such as a stimulation phase, a milking phase, a post-milking phase, and a switch-off phase, with the duration of the phases dependent on the rate of milk flow reaching certain predetermined levels and on time lapse parameters.

U.S. Pat. No. 5,054,425 by Grimm et al. discloses a method of milking an animal, wherein the conditions of the milking operation are substantially stable during a main milking phase and are unintentionally changed during a terminating milking phase. According to the invention, at least one unintentional change in the milking operation conditions during at least one initial milking operation is sensed, at least one milking parameter is registered in response to the sensed unintentional change, and each registered parameter is utilized to change the milking conditions of one or more following milking operations for the same animal before each sensed unintentional change is expected to occur. By the invention the milking may be changed during the post-milking phase to obtain an elimination of or at least a significant reduction of the rest milk in the udder of the animal.

European Patent No. 0954962 B1 discloses a method of automatically milking animals, comprising the following steps: measuring repeatedly or continuously a quantity which is a measure for the momentary pulse milk flow; controlling the duration and/or the level of the milk vacuum under the teat during the actual suction phase on the basis of the measured quantity; storage, during the actual suction phase, of the maximum value of the pulse milk flow measured thus far or the quantity related thereto; and lowering or reducing or closing off the vacuum level of the milk vacuum as soon as the momentary value of the pulse milk flow or the quantity related thereto has come below a specific, preferably adjustable threshold value.

German Patent Application Publication No. 3609275 A1 discloses a method for mechanically drawing off milk. When milk is mechanically drawn off, the change over time of the milk flow from each individual teat is measured within individual pulse cycles and evaluated mathematically in a process computer. This evaluation of milk flow profiles permits the computer to provide actuating variables for controlling or adjusting parameters governing the application of the vacuum to the teat cup cluster, for example the level of vacuum in the suction phase, the duration of the suction phase and the like.

SUMMARY OF THE INVENTION

While the above references disclose different methods and means for improving the milking, they all fail to disclose how to obtain animal individual milking, which is optimized for each single milking animal.

It is therefore an object of the present invention to provide a method for controlling the milking by a milking machine, by which method the milking production is increased, and the animal treatment is improved.

It is a further object of the invention to provide such a method, which is accurate, efficient, reliable, of low cost, and easy to implement.

It is still a further object of the present invention to provide a computer program product for carrying out a method of the above-kind when being run on a computer.

It is yet a further object of the present invention to provide an arrangement to be used with a milking system, wherein the arrangement includes a process and control device capable of carrying out a method fulfilling the above-mentioned objects.

These objects, among others, are attained by the methods, the computer program product, and the arrangement as defined in the appended patent claims.

According to a first aspect of the invention there is provided a method for controlling the milking by a milking machine comprising the steps of: (i) controlling a milking vacuum so that the milking vacuum is varied through the vacuum levels of a given range, while a milking animal is milked by aid of the milking vacuum; (ii) monitoring a milk flow from the milking animal during the variation of the vacuum levels; (iii) setting the milking vacuum to the lowest vacuum level of the given range, for which the milk flow from the milking animal is at least a given fraction of the highest milk flow monitored while the milking vacuum is varied; and (iv) keeping (51) the milking vacuum at the set vacuum level during a following part of the milking of the milking animal.

By means of the present invention the overall milk production is optimized. The milk production can be maximized, while the animal care is maintained or even improved. Each milking animal is not exposed to higher levels of vacuum than necessary to obtain a given milk flow. As compared to the use of a fixed constant milking vacuum for all milking animals, the present invention provides for higher milk throughput since higher flows of milk can be obtained for some milking animals by means of increasing the milking vacuum, and thus the milking times are shortened for these milking animals. For other milking animals, the milk flows can roughly be maintained, while the vacuum levels are decreased, to thereby obtain a more gentle treatment of the teats while maintaining the level of the milk production.

Further characteristics of the invention and advantages thereof, will be evident from the detailed description of preferred embodiments of the present invention given hereinafter and the accompanying FIGS. 1-3, which are given by way of illustration only and thus, are not limitative of the present invention.

In the following detailed description the milk producing animals are cows. However, the invention is not limited to cows, but is applicable to any animals having the capability of producing milk, such as sheep, goats, buffaloes, horses, etc.

DETAILED DESCRIPTION OF EMBODIMENTS

Figure 1:
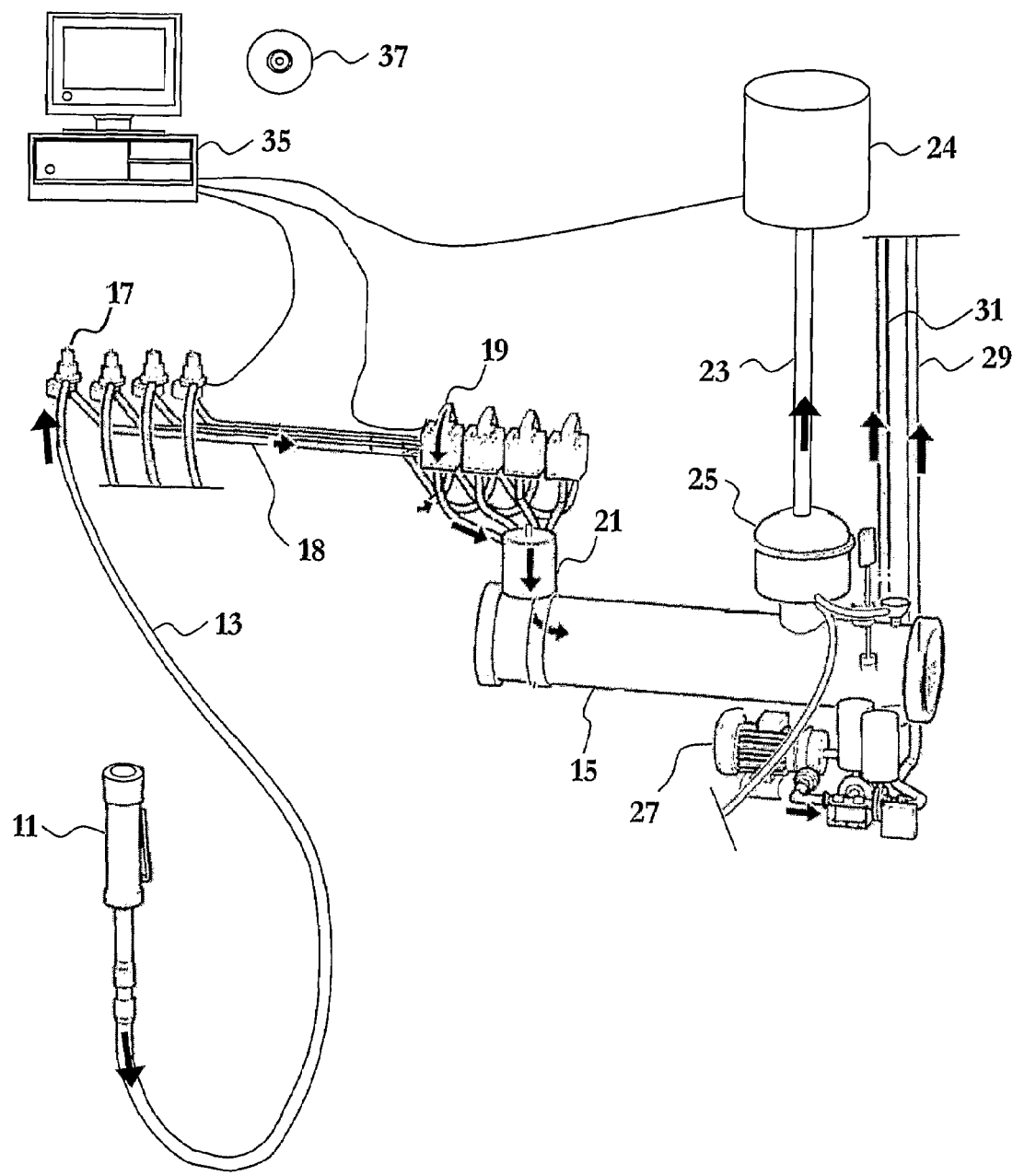
FIG. 1 illustrates schematically, in a perspective view, main components of a milking system, wherein a preferred embodiment of the present invention is implemented.

FIG. 1 illustrates some of the main components of an automated milking system for cows wherein the present invention is implemented. The automated milking system comprises a milking machine having four teat cups 11, of which only one is illustrated for sake of simplicity. Each teat cup 11 is connected to a respective milk tube 13, which in turn is connected to an end unit 15 via a respective valve or regulator 17, a respective milk conduit 18, a respective flow meter 19, optionally a respective conductivity meter or other measuring device such as an infrared spectrometer device (not shown), and a common milk meter 21. The end unit 15 is connected to a vacuum source 24 via a milk/air separator 25 and a vacuum supply conduit 23. The vacuum source 24 may be a vacuum pump of the rotary vane type, but is preferably a frequency controlled pump.

During milking of the teats of a cow, the teat cups are attached to the teats of a cow by a robot or manually, and vacuum is supplied to the end unit 15 via the vacuum supply conduit 23. The valves or regulators 17 may be used to control the individual vacuum levels in the teat cups 11.

A working or milking vacuum is applied through the liner of each teat cup to draw the milk from the teats through the milk lines 13 and into the end unit 15, with the liners periodically opened and collapsed by applications of a pulsating massage vacuum between the liners and the inside of the teat cups.

The milk from each udder quarter of the cow is measured individually by the flow meters 19 and the conductivity meters (not shown), after which the weight of the milk from the cow is measured by the common milk meter 21. Finally, the milk is collected in the end unit 15 and the air is sucked out through the conduit 23.

Further, the milking machine comprises a pump and regulator system 27 for pumping the milk to a recipient, e.g. a milk storage tank, or to a milk truck (not illustrated) via one 29 of a plurality of milk output lines 29, 31 connected to the end unit. Another milk output line 31 may be used for discarding milk from the milking of a cow, for pumping the milk to another tank, or for pumping the milk to a feed device for feeding calves.

The milking machine is advantageously connected to a computer-based processing and control device 35, which is responsible for processing and controlling of the milking machine, and comprises typically a microcomputer, suitable software, and a database including information of each of the cows milked by the milking machine, such as e.g. when the respective cow was milked last time, when she was fed last time, her milk production, her health, etc.

Particularly, in connection with the present invention, the computer-based processing and control device 35 receives instantaneous milk flow measures from, and optionally controls, the flow meters 19, and controls the vacuum source 24 and the valves or regulators 17.

The present invention presents a novel method of controlling the milking vacuum during milking. According to the present invention the milking vacuum is varied or passed through the vacuum levels of a given range under the control of the computer-based processing and control device 35, while a cow is being milked. The milking vacuum is adjusted by the vacuum source and/or by the valves or regulators 17.

During the variation or change of the vacuum levels, a milk flow from the cow is repeatedly or continuously monitored. The milk flow that is monitored may for instance be the sum of the individual instantaneous milk flow measures from the flow meters 19. Then, the milking vacuum is set to the lowest vacuum level of the given range, for which the milk flow from the cow is at least a given fraction of the highest milk flow monitored while the milking vacuum is varied, and finally the milking vacuum is kept at the set vacuum level during a following part of the milking of the cow.

Preferably, the vacuum levels range from about 90% to about 110% of a nominal vacuum level value such as about 45 kPa.

Still preferably, the given fraction of the highest milk flow monitored is 0.9, preferably 0.95, and most preferably 0.99. However, the fraction may be as high as 1.0.

It shall be appreciated that one milking may be divided into different phases, such as e.g. a teat cup application phase, a milk flow increasing or milk stimulation phase, a main phase, a milk flow decreasing or milk residue milking phase, and a teat cup take off phase. While, the present invention may be implemented into anyone or any combination of these phases, it is preferably implemented into the main milking phase.

Figure 2:
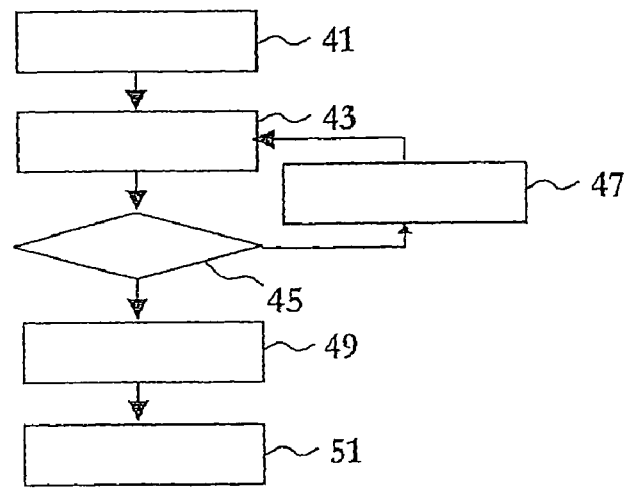
FIG. 2 is a flow scheme of a method for controlling the milking by the milking system of FIG. 1 according to an embodiment of the present invention.

With reference to FIG. 2 an example embodiment of the above method will be outlined. The vacuum level is, in a step 41, set to the lowest value in the range, while a main milking phase of the milking of the cow is to be commenced. Next, the milk flow from the cow is, in a step 43, measured. The milk flow value is, in a step 45, compared with the immediate preceding milk flow value of the milking of the cow, and if the present milk flow value is at least a factor of $F_1$ times larger than the immediate preceding milk flow value (or the difference $D_1$ of the present milk flow value and the immediate preceding milk flow value is larger than a given value $V_1$), the vacuum level is, in a step 47, increased by a factor $F_2$ (or is increased by a given value $V_2$). The method is then returned to step 43, i.e. the milk flow from the cow is again measured.

When the method is first started, there exists no preceding milk flow value, and this value is therefore set to a default value of zero, i.e. at least the first time a comparison is made in step 45, the method continues by step 47.

The loop formed by steps 43, 45, and 47 is run until the present milk flow value is not at least a factor $F_1$ of times larger than the immediate preceding milk flow value (or the difference $D_1$ of the present milk flow value and the immediate preceding milk flow value is not larger than a given value $V_1$). At this point, the increase in vacuum level is terminated, and the vacuum level is, in a step 49, kept at present level or decreased to the second last value. Finally, this vacuum level is kept, in a step 51, during the remaining part of the main milking phase of the milking of the cow.

The factors $F_1$ and $F_2$, the difference $D_1$, and the given values $V_1$ and $V_2$ may be selected in a different of ways readily apparent to a person skilled in the art while reading the present description. The figures may be calculated, or may be tested experimentally.

By means of the present invention the overall milk production can be optimized. The milk production can be maximized, while good animal care is maintained. Each cow is not exposed to higher levels of vacuum than necessary to obtain desired milk flows. As compared to the use of a fixed constant milking vacuum for all cows, the present inventive cow individual adaptive adjustment of the milking vacuum provides for higher milk throughput since higher flows of milk can be obtained for some cows by means of increasing the milking vacuum. For other cows, the milk flows can, in principle, be maintained, while the vacuum levels are decreased. This decreases the impact on these cows and further, power consumption is reduced provided that a frequency controlled pump is used for adjusting the vacuum levels.

Figure 3:
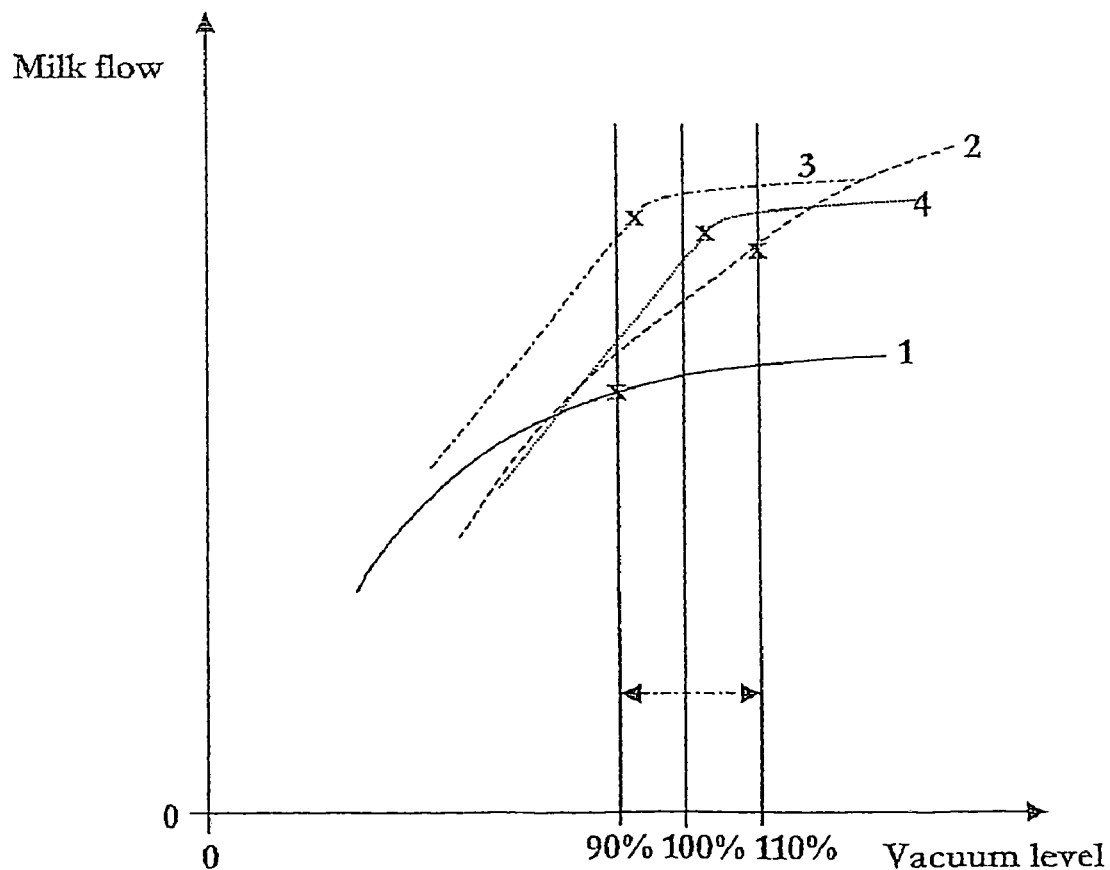
FIG. 3 is a schematic example diagram of milk flow as a function of applied milking vacuum for different cows, for which milking vacuum levels selected in accordance with the present invention are indicated.

FIG. 3 is a schematic example diagram of milk flow as a function of applied milking vacuum for four different cows numbered 1, 2, 3, and 4, for which milking vacuum levels selected in accordance with the present invention are indicated. The vacuum levels, which are searched, range from 90% to 110% of a nominal value (corresponding to 100%) as indicated by the double-directed arrow. Assuming now that the lowest vacuum level of the indicated range, for which the milk flow from the cow is at least about 95% of the highest milk flow monitored while the milking vacuum is altered, and that the diagram has linear scales, the milk vacuum will be set to the levels indicated by the x signs for the respective cows.

The milk flow curve for cow No. 1 is very flat indicating that the milk flow only very slightly increases with increased milking vacuum. The lowest possible vacuum level, i.e. 90% of the nominal value, is selected for the continuing part of the milking of this cow. The milk flow curve for cow No. 2, on the other hand, increases fastly with increased milking vacuum in the indicated range. The highest possible vacuum level, i.e. 90% of the nominal value, is selected for the continuing part of the milking of cow No. 2. The milk flow curves for cows Nos. 3 and 4 increase fastly with increased milking vacuum in a lower portion of the range, and more slowly with increased milking vacuum in a higher portion of the range. The milk flow slope for cow No. 3 decreases abruptly in the lower half of the range, and the milk flow slope for cow No. 4 decreases abruptly in the higher half of the range. While applying the inventive method, a vacuum level of about 93-94% of the nominal value is selected for the continuing part of the milking of cow No. 3, whereas a vacuum level of about 103-104% of the nominal value is selected for the continuing part of the milking of cow No. 4.

FIG. 3 clearly illustrates that different milking vacuum levels may be needed for different cows to obtain milk flows close to maximum.

The inventive method may be performed each time the cow is milked, or may be performed more rarely. If performed more rarely, the milking vacuum used during the remaining part of the main milking phase of the milking of the cow, is used during the main milking phase of each subsequent milkings of the cow until the inventive method is again performed.

Preferably, the inventive method is performed more frequently when the cow is in the beginning of the lactation, and more rarely when the cow is in a later part of the lactation.

Since the individual milk flows from each teat or udder quarter can be measured separately by the flow meters 19, and the individual vacuum levels in the teat cups 11 can be controlled separately via the valves or regulators 17, the inventive method may be performed on a teat or udder quarter individual basis. Thus, for a given cow the vacuum level can be different in each of the teat cups during the main milking phase. The four milk flow curves of FIG. 3 could in principle apply to the four udder quarters of a single cow.

The various methods of the present invention can be implemented as a computer program product, e.g. on a compact disc 37, which is loadable into the internal memory of the computer-based processing and control device 35. The computer program product comprises software code portions for performing the various methods when the product is run on the computer-based processing and control device 35.

While the present invention has been described as being implemented in a particular kind of automated milking system, it shall be understood that the same may alternatively be implemented in other automated milking system, as well as in semi-automated or manual milking systems. The references cited in the prior art section describe some of these alternative milking systems, the contents of which being hereby incorporated by reference.

The invention claimed is:

1. A method for controlling milking by a milking machine, comprising:
    controlling a milking vacuum so that the milking vacuum is varied through vacuum levels of a given range, while a milking animal is milked by an aid of said milking vacuum;
    continuously monitoring a milk flow from said milking animal during said variation of the vacuum levels;
    setting said milking vacuum to the lowest vacuum level of said given range, for which said milk flow from said milking animal is at least a given fraction of the highest milk flow monitored while said milking vacuum is varied; and
    keeping the milking vacuum at a set vacuum level during a subsequent part of the milking of said milking animal.

2. The method of claim 1, wherein said given fraction of the highest milk flow monitored is 0.9.

3. The method of claim 2, wherein said given fraction of the highest milk flow monitored is 0.95.

4. The method of claim 2, wherein said given fraction of the highest milk flow monitored is 0.99.

5. The method of claim 1, wherein the vacuum levels of said given range are controlled to be varied from low to high.

6. The method of claim 5, wherein said variation of the vacuum levels is controlled to be terminated when said monitored milk flow does not increase more than a given amount for a given increase in the vacuum level.

7. The method of claim 1, wherein the vacuum levels range from about 90% to about 110% of a nominal vacuum level value of about 45 kPa.

8. The method of claim 1, wherein said method is performed each time said milking animal is milked by said milking machine.

9. The method of claim 1, wherein
    said method is performed more rarely than each time said milking animal is milked by said milking machine, and
    a milking vacuum at the set vacuum level is applied during at least a part of the milking performed after said milking vacuum is set but before said method is performed next time.

10. The method of claim 9, wherein said method is performed at a first frequency when said milking animal is in the beginning of the lactation, and at a second frequency when said milking animal is in a later part of the lactation, said first frequency being higher than said second frequency.

11. The method of claim 1, wherein said method is performed during a main milking phase of the milking of said milking animal.

12. The method of claim 11, wherein said subsequent part of the milking of said milking animal is the remaining part of the main milking phase of the milking of said milking animal.

13. The method of claim 1, wherein said milking vacuum is controlled and set by means of adjusting a frequency controlled pump.

14. The method of claim 1, wherein said method is implemented in an automatic milking system.

15. The method of claim 1, wherein said method is performed on an animal individual basis.

16. The method of claim 1, wherein said method is performed on an udder quarter individual basis.

17. A computer program product loadable into the internal memory of a computer of a milking station, comprising software code portions for carrying out the method as claimed in claim 1 when said product is run on said computer.

18. An arrangement to be used at a milking station comprising a milking machine, said arrangement including a process adapted to carry out the method as claimed in claim 1.

\* \* \* \* \*